(12) United States Patent
Lam

(10) Patent No.: US 6,455,953 B1
(45) Date of Patent: Sep. 24, 2002

(54) DUAL POWER MODES ELECTRONICS APPARATUS

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 0 days.

(21) Appl. No.: 09/499,782

(22) Filed: Feb. 8, 2000

(51) Int. Cl.⁷ .............................. H02J 1/10; H02J 7/00
(52) U.S. Cl. .......................................... 307/23; 307/66
(58) Field of Search ............................ 307/23, 66, 83, 307/11, 48; 363/40, 41, 37, 39; 323/273; 455/127, 128, 343

(56) References Cited

U.S. PATENT DOCUMENTS

| | | | |
|---|---|---|---|
| 4,779,037 A | * 10/1988 | LoCasco | 323/275 |
| 4,860,185 A | * 8/1989 | Brewer | 363/41 |
| 5,136,175 A | * 8/1992 | Losel | 307/66 |
| 5,166,538 A | * 11/1992 | Norton | 307/10.1 |
| 5,412,309 A | * 5/1995 | Ueunten | 323/316 |
| 5,650,785 A | * 7/1997 | Rodal | 342/357 |
| 5,701,597 A | * 12/1997 | Nakanishi et al. | 455/127 |

* cited by examiner

Primary Examiner—Rajnikant B. Patel

(57) ABSTRACT

A dual power sources apparatus operates in a normal low power mode and a momentary high power mode. One of the power source is of limited current capability and unlimited energy capacity. The other power source has much higher current capability but of limited energy capacity.

45 Claims, 2 Drawing Sheets

DUAL POWER MODES ELECTRONICS APPARATUS

FIELD OF THE INVENTION

The present invention relates to a cost saving power sharing design suitable for apparatus having dual power sources. The invention is particularly suitable for the design of electronics apparatus having one of the power source to be of limited current capability but with unlimited energy capacity. The other power source has much higher current capability but of limited energy capacity.

BACKGROUND OF THE INVENTION

Traditional designs of electronics products make use of a single power supply to power the product. If a product is portable, batteries are used. If a product is stationary, a transformer circuit, switching supply or external adapter converting high voltage city power into low DC voltage is used to power the analog and digital circuits of the product. In some applications such as audio boom box and cordless phone, combination of batteries and city power can be used. Other than all these traditional power sources, limited current power supply can be obtained from some communication line, which connects the apparatus to an external device. Typical examples of these energy supplying communication lines are telephone line and RS232 serial port. In particular, the early type of USB interface provided by many computers is able to source up to 500 mA of current to the connecting equipment.

SUMMARY OF THE INVENTION

The present invention is directed to the circuit design of a low cost high efficiency power distribution circuit making use of the characteristics of the untraditional power source, such as the RS232 serial port, parallel port and USB port to support powering a product, so as to minimize the product cost and/or running cost of the traditional power supply, such as the adapter or batteries to be used.

The invented design originates from in depth study of the operation modes of an electronics apparatus. In an application embodiment, the first requirement of an useful application of the invention is that the circuitry of an electronics apparatus should be operated in at least two operation modes, an occasional high current mode and a normal low current mode. The second condition required is that an unlimited energy capacity but limited current capability power source is available during the normal operation of the apparatus. A typical example of this kind of power supply is the communication line previously mentioned. The third requirement is that the current limited power source is adequate to power the low current operation mode but inadequate to power the high current operation mode. The fourth condition required is that the apparatus is in the low current operation mode most of the time, the high current operation mode is momentary or occasional. When all these conditions are met, the power system of the apparatus can be configured in a way that the normal low current operation mode is powered by the limited current power source. The traditional power source such as batteries or city power is configured to supplement operating power during the high current modes only. In the situation of a battery powered apparatus, the battery life of the product is much longer because battery power is utilized only during the very short and less frequent high power operation durations. As a result, batteries are to be replaced less frequently and the product is more environmental friendly.

In a first embodiment, an in house paging system is designed to page employees inside an office building. Multiple low power RF transmitters are connected to the telephone line sockets of the building. The transmitters of the paging system normally stay at a low current standby mode waiting to receive a paging instruction. Normally the activation circuit and logic circuit of the transmitter unit are adequately to be powered by the energy supplied by the telephone line. When an activation signal is received, each transmitter transmits the RF paging signal. The RF transmitter requires a higher power than the current can be provided by the telephone line. In this application, the transmitting power or current of the transmitter can be obtained from a battery, AC power converting circuit or adapter connected to the city power supply. It is more user friendly for the transmitter units to be self powered or that it can be installed at any location remote from a power socket. When internal or externally connected batteries are used, in accordance to the invention, the battery power is switched to the RF circuit only when a paging signal is transmitted by the RF circuit, which happens occasionally. During the low power standby mode, the batteries are completely isolated from the application circuit; and the telephone line powers the receiving and logic circuit of the transmitter unit. Alternatively, it is more preferable for the batteries to be rechargeable and receives small charging current from the telephone line when the transmitter is idle. In this way the transmitter unit is maintenance free because the batteries servicing the higher current RF transmission mode are not to be replaced.

If a limited current communication line is not available, or the power delivered by the communication line is inadequate for the low current operation mode, the target electronics apparatus is preferably to be powered by a transformer circuit, switching power supply circuit or an adapter connected to the city power. Usually the cost of the switching supply, transformer circuit, or external adapter is proportional to the power rating of the power converting circuit. When higher power is to be delivered, more material is required to build the power converting circuit and the cost of the transformer, switching supply or adapter will be higher. If the normal operation power of the apparatus is low but the occasional power of an operation mode is very high, traditionally a high power conversion circuit design is required to meet the power requirement of the apparatus during the occasional high current operation mode. The cost of the relative expensive power conversion circuit can be reduced if a second battery or rechargeable power supply is added into the system just to supplement or power the short moment of the peak power required by the high current operation mode. A typical example of this kind of operation is a portable disk drive, R/W CD ROM or tape drive (a back up apparatus) used to backup data of a computer. The standby mode of the back up apparatus takes very small current, usually less than 30 uA. If the back up apparatus is reading or writing data, the current goes up to around 300 mA for powering the spinning motor. A momentary high power condition is defined by the moment when the motor is first started. The start up current of a motor may be as high as 800 mA, or higher. The most demanding situation of the power requirement is when the diskette or tape cassette is to be ejected by a solenoid, the solenoid used in the ejection mechanism may requires a peak current of 1.2 ampere or higher. In this application example, the power adapter is to be rated to 1.2 A in order for the unit to work properly. If a battery is provided inside the unit to supplement the momentary power required during the short moment when the motor is first started or when the solenoid is energized, the power adapter can be designed to handle only 350 mA, a limited current just enough to handle the running current of the motor. In this way size of the power adapter is shrank, cost is cheaper, less material is used and the product is more environmental friendly. Usually two AA batteries installed inside this drive can last over one or two years because the supplemental battery power is used only during the occasional start up of the inductive motor and solenoid, and that the duration of high current operation usually lasts a fraction of a second. If the data back up apparatus is connected to a USB port, the USB bus will supply 500 mA which is adequate to power the electronics circuit and normal running of the motor. In this application, with a supplemental battery, the external power adapter can be completed eliminated. It should be noted that inductive load are not limited to motor and solenoid, any other coil wound components such as coupling transformers and relay are included.

In order for the product to be more user friendly and care free, it is beneficial to have a small capacity rechargeable battery built inside the above mentioned application example. The battery is smoothly charged by the smaller size adapter or USB port during the idle time of the back up apparatus. The stored energy is then discharged to supplement the current required for starting up the motor or energizing the solenoid.

The novel features of the invention are set forth with particularly in the appended claims. The invention will be best understood from the following description when read in conjunction with the accompanying drawings.

DESCRIPTION OF THE PREFERRED EMBODIMENT

Figure 1:
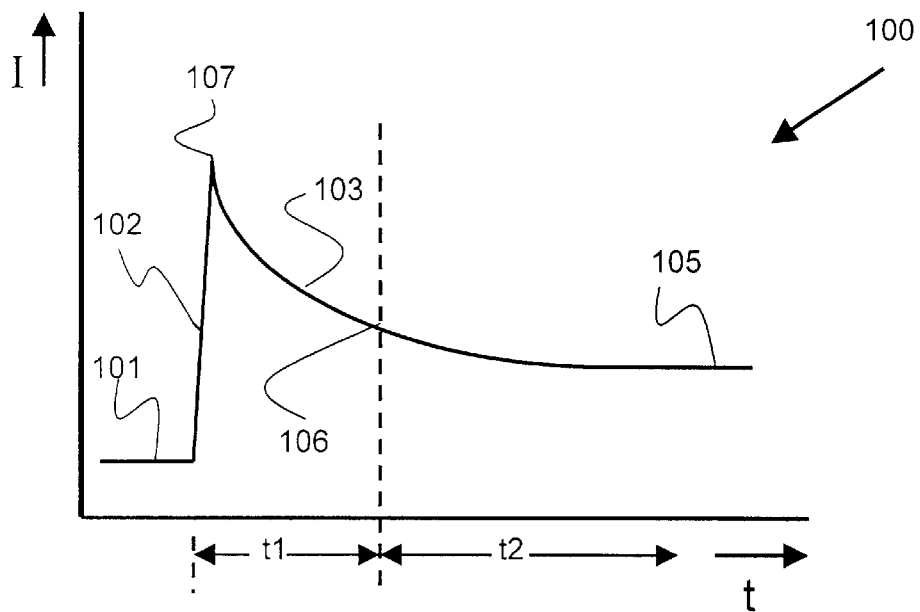
FIG. 1 illustrated a current loading curve when a motor or solenoid is energized.

FIG. 1 illustrated the current loading curve of an electronics apparatus having a motor. The low current level 101 is the standby current of the electronics apparatus under normal operation. When an instruction coming from a microprocessor starts the motor of the apparatus, a current spike having a sharp current slope 102 occurs. The peak of the current spike 107 is defined by the DC impedance of the motor coil winding. The motor is usually required to overcome a higher starting load due to the higher starting static friction of the load and also the slow initial speed. The loading of the motor gradually reduces when the speed picks up. The consumption current gradually reduces accordingly along the decaying curve 103 and eventually reaches a steady current state 105 when the motor runs at a steady speed. The duration t1 for the motor to approach a steady speed from start up depends on the driving capability of the motor, the mechanical advantage of the gear down mechanism and also the loading characteristics. In accordance to the characteristic of the motor current curve, the power supply system of the electronics apparatus was designed to handle the peak current 107, although this peak current situation only happens occasionally and lasts for a very short duration.

Figure 3:
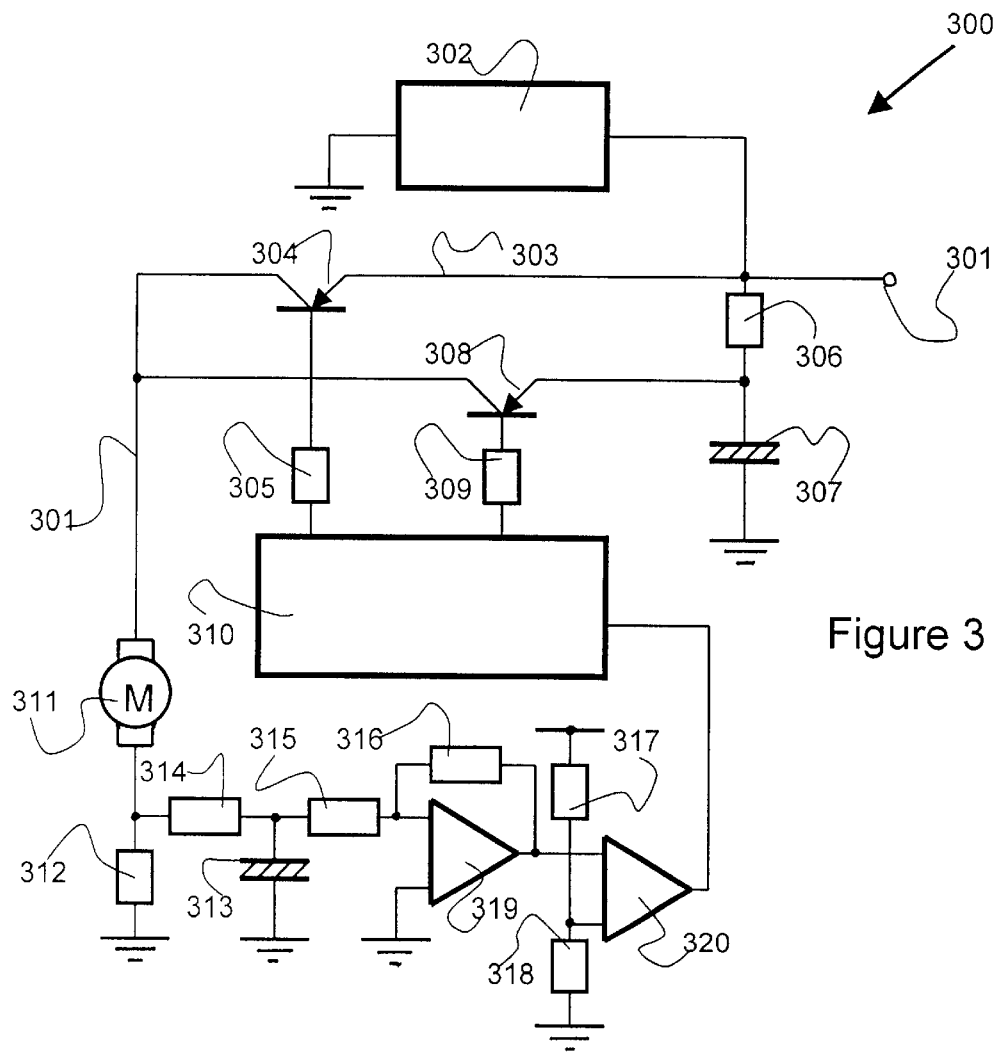
FIG. 3 illustrates an alternate embodiment using a USB communication line to drive a motor.

Attention is now drawn to FIG. 3, which illustrates an embodiment of the motor driving circuit. Circuit block 302 represents the application circuit of the electronics apparatus 300. Circuit block 310 represents the switching control circuit, which controls the power source to be connected to power the motor 311. There are two power sources. The first one is the traditional power source such as an external power adapter, or a USB port derived from a computer system. This power source is connected to the power input terminal 301. This type of power source is of unlimited energy capacity but of limited current capability. It means that although the current capability of the power source is limited, this power source will not be exhausted like regular batteries. The second power source is a local limited capacity power source represented by the capacitor 307. With organic electrolyte, super capacitors with capacitance over 10 Farads are now available. These capacitors are capable to drive motors of toy cars for minutes. Switch 304 when turned on, connects power source 301 to the motor 311. Switch 308, when turned on, connects the capacitor 307 to the motor 311. During a low current standby mode, the switches 304 and 408 are both turned off. It should be noted that the switching circuit connecting a power source to a load can be completely turned on as in the situation of a relay, resistive or partially turn on, or gradually turned on according to different requirements of the switching circuit. The first power source 301 supplies a small standby current to the application circuit 302. Besides, the first power source is configured to tickle charge the second power source 307 through resistor 306. When the motor 311 is started, switch 308 is turned on first to provide the higher start up current required by the motor. Switch 308 remains connected during the whole period of t1 as illustrated in FIG. 1 until the motor current drops to a point 106 which is then affordable by the limited current power source 301. At this moment, switch 308 is turned off and switch 309 is turned on. Since voltage of the first power source is usually higher than that of the second one, there will be a slight jump in current when the driving current is handed over by the capacitor 307 to the first power source 301. The magnitude of the current jump depends on the output impedance of the two power sources and should be taken into account when designing the cut off point 106 illustrated in FIG. 1.

In some application the motor is powered by a limited current power source, such as the USB communication line provided by a computer. Usually the peak current 107 well exceeds the upper limit of the USB output current specification of the USB. The second power source 307 represented by a regular battery, rechargeable battery or a power capacitor is therefore required for starting and speeding up the motor until the running current is affordable by the USB port. If the total running current of the motor, the control circuit 310 and the application circuit 302 is still within the capability of the USB port, then a power adapter is no longer required to power the product and significant component saving can be realized.

There are many different possible modes for the switching control circuit 310 to handle the power switching timing. In a first method the engineer is required to study the current characteristic of the motor by experiments and provide a delay time longer than t1 of FIG. 1 for the power switch 308 to be turned on. Another way is to build in a current detector to directly or indirectly measure the current loading of the motor. Resistor 312 connecting in series with the motor represents a current sensor to control the power switch operation. The resistance of resistor 312 is of very low resistance not to affect the performance of the motor circuit.

The voltage developed across the resistor 312 is amplified by the amplifier 319. This voltage is then compared with a voltage reference created by resistors 317 and 318. The output of the comparator 320 is then fed to the switching control circuit 310 to initiate the power source switch over action when the motor current drops below a certain predetermined level. The RC circuit 314 and 313 filters out motor noises for the current sensing circuit. The resistor ratio 315 and 316 determines the gain of the amplifier 319. It should be noted that the switching control circuit 310 can be considered to be part of the application circuit 302 when current consumption is to be calculated. The switching control circuit 310 illustrated on FIG. 3 is separated from the application circuit 302 for the ease of demonstrating the operation of the embodiment.

In case the first power source 301 is derived from a transformer circuit, an external adapter or a switching power supply; the addition of a battery or the super capacitor 307 will enable the current rating of the first power source to be reduced in size; from the 107 level to 106 level of FIG. 1. As a result, considerable saving in the cost of the power supply circuit is achieved.

Figure 2:
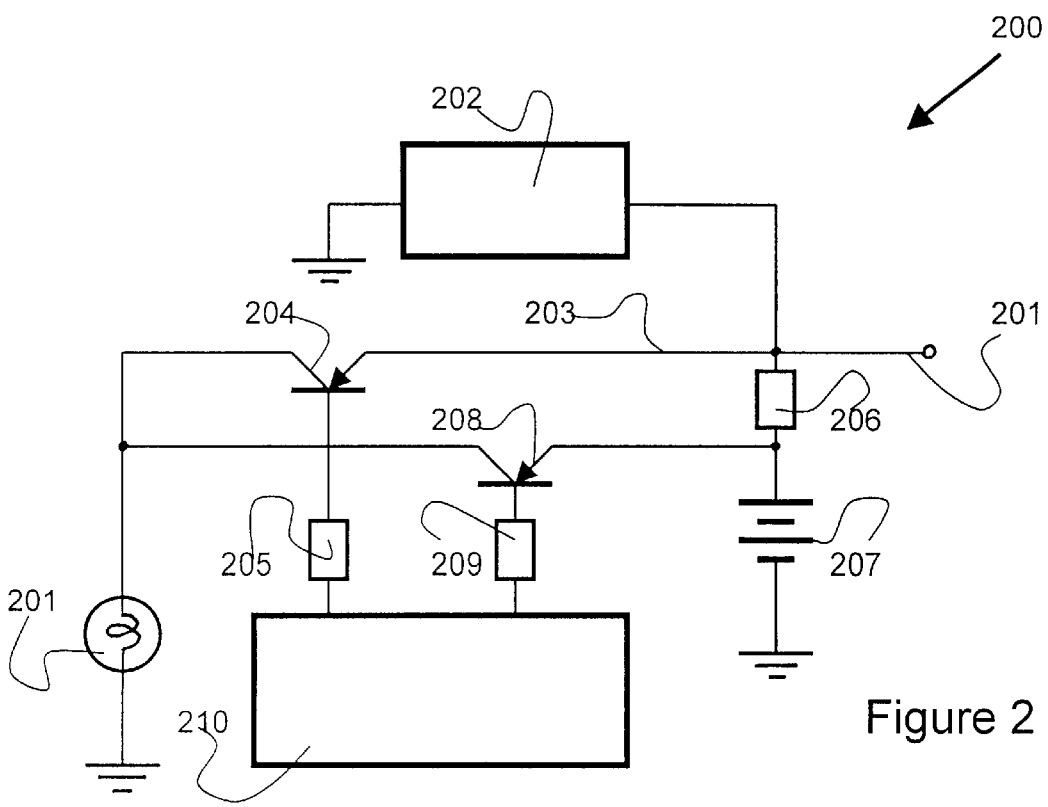
FIG. 2 illustrates an embodiment using a limited current adapter to drive a light bulb.

Direction is now drawn to FIG. 2 where a light bulb 201 is to be powered instead of a motor. The application principle of the power switches 204, 208, the application circuit 202, the switching control circuit 205, the charging resistor 206 and the battery 207 are identical to that of FIG. 3 discussed above. The attention is drawn to the current characteristic of the light bulb when compared with that of a motor. In fact the current curve of the light bulb is very close to the illustration of FIG. 1. The tungsten filament of a light bulb is of very low impedance when it is cold. The impedance goes up when the filament is heated up and light energy is emitted. When a light bulb is considered, the peak current 107 represents the cold filament current of the light bulb. When the filament is heated up, the impedance of the filament increases and the current gradually drops along the curve 103 to a steady level 105. Usually the peak current of a light bulb is two to three times that of the steady light up current. The battery 207 is turned on by the switch 208 to provide the high current required by the light bulb before the filament is heated up. When the filament temperature is hot enough and the current drops to a level 106 affordable by the power source 201, switch 208 is turned off and switch 204 is turned on. The light bulb is then powered by the limited current first power source 201 from that moment onward. If the battery 207 is not a rechargeable battery, resistor 206 should be deleted. If the battery 207 is rechargeable, the limited current power source 201 charges the battery 207 through the resistor 206, during the idle mode of the electronics apparatus 200.

Figure 4:
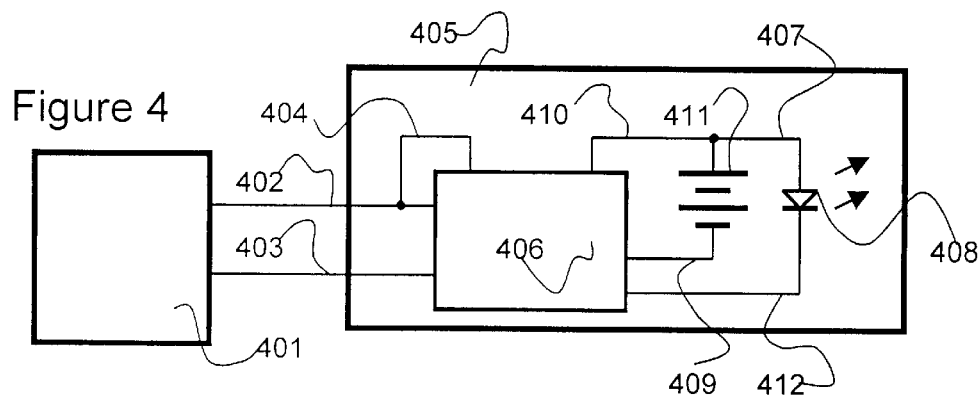
FIG. 4 is the block schematic diagram of an in house paging transmitter apparatus.

Attention is now drawn to FIG. 4 which illustrates the block diagram of another embodiment, a generic electronics apparatus connecting to the telephone socket. A typical application example of this embodiment is an in house paging transmitter. The in house paging system is useful to locate an employee inside large corporate buildings, without paying for the servicing fee of a public paging system. Block 401 represents a paging management system. When a paging request is received by the system 405, a wake up signal is sent to the paging transmitter 405 through the in house telephone line represented by the wires 402 and 403. The paging request is dialed into the management system 401 by intercom phone line. When a request is received, the management system 401 dials up all different RF transmitters located at different areas inside the buildings. The transmitter units, each represented by the block 405, are installed at convenient locations within the corporation premises. The paging signal sent by the management system wakes up the application circuit 406 which turns on the RF transmitter to transmit the paging codes. During standby, the application circuit was designed to enter an idle mode that consumes a very small current. The power supply of the application circuit 406 is obtained from the signal line 402 through the path 404. When a wake up signal is received, internal circuit of the management system 406 immediately switch the power supply line from 404 to the secondary power supply 411. In order for the power supply of the application circuit not to be interrupted, a power reservoir comprising a conventional diode plus capacitor or switch plus capacitor circuit is recommended to hold the initial power supply voltage when the voltage level of the low current power line 404 drops. In many situations the current supplied by the telephone line may not be sufficient to power active operation of the application circuit 406 especially during a RF transmission. The current flowing through the communication line 402 may be just enough to main the idle mode. On the other hand, the battery 411 is capable of providing much higher current than the communication line 402 to service the code reception and transmission modes of the application circuit 406. When the application circuit is transformed from a low current mode to a high current operation mode, the power supply of the application circuit is switched from the telephone line supported power path 404 to the battery supported power path 410. Since the duration of higher current mode is short and occasional, and the battery 411 is not connected most of the time, energy of the battery 411 is reserved. Similar to the embodiment of FIG. 2 and FIG. 3, if rechargeable batteries are used, the battery 411 can also be tickle charged by the voltage of the communication line 402 during the idle mode. In this way the transmitter unit 405 is completely maintenance free and does not require an external power adapter. The embodiment of FIG. 4 is identical in nature to that of FIG. 2 and FIG. 3 except the low current load and the high current load are not clearly identified. It is therefore desirable to broadly defining the lower power load as a low power operation mode of the application circuit and the high power load as a higher power operation mode of the application circuit.

When current calculation is considered, it is reasonable to assume the standby current of the application circuit 406 to be around 20 uA as in most CMOS logic circuits. When a paging signal wakes up the application circuit, it is assumed that the running current of the application circuit to be around 5 mA to 10 mA. The LED 408 represents a low current load, which operates around 10 mA to 20mA. If the LED 408 is replaced by another higher current load, the return path 412 of the load is recommended to be going through a switch and derive power from the battery 411 when the load is activated. The ground path of the circuit is represented by the lines 403 and 409.

In the embodiment of the in house paging system, every employee working for the company is provided a receiver. Each receiver is programmed with a unique receiving ID. When a paging signal is received, each receiver compares it's ID with the target receiver ID received. If the two ID numbers match with each other, the receiver activates the paging notification signal and display the extension number or message of the party who had sent the paging signal. Since each pager is assigned a unique paging ID, it is convenient to equate this personal ID with the employee number or directly the name of the employee. A further step is to integrate the paging receiver with the employee ID card so that the integral card can be conveniently carried by an employee inside the company premises.

Other than connecting the paging transmitting unit with a telephone line, the management system block 401 may represent a computer connected to the company computer network. The communication lines 402 and 403 may represent a serial cable or a USB cable connected to the transmitter unit 405. When a paging request is initiated by any computer connected to the company network, the receiver ID and the paging message is broadcasted to every computer hooked up with the network. A software program inside each computer will activate the transmitter to transmit the receiver ID and paging message. Since computers are installed at different locations inside the company premises, relative low RF power is required for the paging signal to effectively cover most of the company premises. Because the paging RF spectrum is not being used all the time, for more economic utilization of the RF spectrum, it is desirable for the paging RF signal to share the transmitting spectrum of other office RF communication links, such as the remote control channel, or RF data communication channels. If long range or short range RF communication hardware such as 900 MHz channel, 2.4 GHz channel, blue tooth or any other commercial RF transmitters are installed in the office computers, it is economical to integrate part or whole of the RF circuitry of the data communication channels with the invented paging system. It should be noted that when shared resources RF communication system are to be implemented, it is important to properly encode the RF signal with ID codes to identify if the signal sent is for paging or for other data communication purposes.

Although detailed embodiments of the invention have been disclosed, it is recognized that variations and modifications, all within the spirit of the invention, will occur to those skilled in the art. It is accordingly intended that all such variations and modifications be encompassed by the appended claims.

I claimed:

1. An electronics apparatus comprising:
   a limited current capability first power source; and
   a second power source having a higher current capability than said first power source;
   characterized in that said electronics apparatus is configured to have a low current operation mode and an occasional high current operation mode, and that the limited current provided by said first power source is inadequate to support normal operation of said high current operation mode.

2. The electronics apparatus of claim 1 wherein said electronics apparatus comprises a first load defining said low current operation mode and a second load defining said high current operation mode.

3. The electronics apparatus of claim 2 wherein at least part of the turn on duration of said second load represents said high current mode.

4. The electronics apparatus of claim 3 further comprising a first switching circuit to connect said second load to said second power source.

5. The electronics apparatus of claim 4 further comprising a second switching circuit to connect said second load with said first power source during said lower current operation mode.

6. The electronics apparatus of claim 5 further comprising a control circuit to control the operation of said first and second switching circuits.

7. The electronics apparatus of claim 6 wherein said second switching circuit is turned on at a delayed time after the second load is turned on by said first switching circuit.

8. The electronics apparatus of claim 6 further comprising a current sensing circuit; wherein said control circuit turns on said second switching circuit in accordance to the feedback of said current sensing circuit.

9. The electronics apparatus of claim 1 further characterized in that the short fall in current during the high current mode is made up by said second power source.

10. The electronics apparatus of claim 1 wherein said high current operation mode is configured to be momentarily turned on during the operation of said apparatus.

11. The electronics apparatus of claim 1 wherein said first power source is external to said apparatus.

12. The electronics apparatus of claim 11 wherein said second power source is internal to said apparatus.

13. The electronics apparatus of claim 11 wherein said first power source has unlimited energy capacity.

14. The electronics apparatus of claim 12 wherein said second power source has limited energy capacity.

15. The electronics apparatus of claim 1 wherein said high current mode is configured to be mainly powered by said second power source and said low power mode is configured to be powered by said first power source.

16. The electronics apparatus of claim 1 wherein said apparatus receives power from said first power source during said low power mode operation.

17. The electronics apparatus of claim 1 wherein said second power source is a rechargeable device.

18. The electronics apparatus of claim 17 wherein said second power source receives charges from said first power source.

19. The electronics apparatus of claim 18 wherein said second power source receives charge from said first power source when said apparatus is not operating under said high current operation mode.

20. The electronics apparatus of claim 1 wherein said second power source comprises a battery or a capacitor.

21. The electronics apparatus of claim 1 wherein said first power source is a circuit converting high voltage city power into low voltage power for the operation of said electronics apparatus.

22. The electronics apparatus of claim 1 wherein said first power source is derived from a computer.

23. The electronics apparatus of claim 1 wherein said first power source is derived from a communication line.

24. The electronics apparatus of claim 1 wherein said second load is a light bulb.

25. The electronics apparatus of claim 1 wherein said second load is an inactive load such as a solenoid or a motor.

26. The electronics apparatus of claim 1 wherein said first power source is of higher voltage than said second power source.

27. The electronics apparatus of claim 1 wherein said electronics apparatus is a data back up apparatus.

28. The electronics apparatus of claim 1 wherein said electronics apparatus is the transmitter of a paging system.

29. The electronics apparatus of claim 28 wherein said pager transmitter is connected to a phone line.

30. The electronics apparatus of claim 28 wherein said pager transmitter is connected to a computing device.

31. The electronics apparatus of claim 30 wherein the spectrum of said pager transmitter is shared with that of a RF data communication link.

32. The electronics apparatus of claim 30 wherein at least part of the RF circuit representing said paging transmitter is shared with the transmitter circuit of a RF data communication link.

33. An electronics apparatus comprising:
   a high capacity, limited current capability first power source;

a limited capacity, higher current capability second power source;

a first load;

a second load having a momentary high current operation mode;

characterized in that said second load received power from said second power source during said high current operation mode.

34. The electronics apparatus of claim 33 wherein said second load has a lower current operation mode and said second load receives power from said first power source during said lower current operation mode.

35. The electronics apparatus of claim 33 wherein said second power source is a rechargeable power source receiving charging current from said first power source.

36. A digital data storage device having an inductive load comprising:

a first power source powering the normal operation of said digital data storage device; and a second power source providing power to said inductive load.

37. The digital data storage device of claim 36 wherein said second power source provides power to said inductive load during the initial period when said inductive load is turned on.

38. The digital data storage device of claim 36 wherein said first power source converts AC city power into DC low voltage suitable for the operation of electronics analog and/or logic circuits.

39. The digital data storage device of claim 36 wherein said second power source is rechargeable.

40. A paging transmitter having a majority low power operation mode and a high power operation mode comprising:

a first power source powering most of the low power operation mode of said transmitter; and a second power source which is connected to the operation circuit during said high power operation mode.

41. The paging transmitter of claim 40 wherein said first power source is represented by the current derived from a telephone line.

42. The paging transmitter of claim 41 wherein said first power source is represented by the current derived from a computer.

43. The electronics apparatus of claim 1 further comprising a load that defines both the low current operation mode and said occasional high current high power operation mode.

44. The electronics apparatus of claim 1 wherein said apparatus is powered by both first and second power sources during said high current power mode.

45. The digital data storage device of claim 36 wherein said inductive load is defined by a solenoid or a motor.

* * * * *